W. E. HAGAN.
Hot Air Furnace.
No. 1,987. Reissued June 6, 1865.
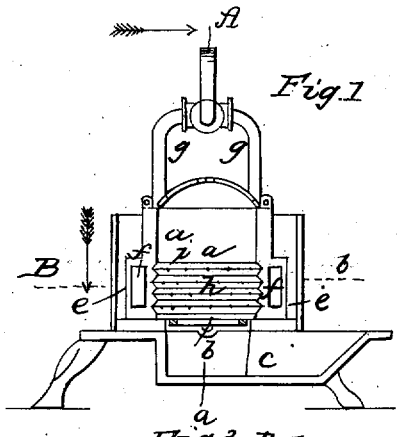
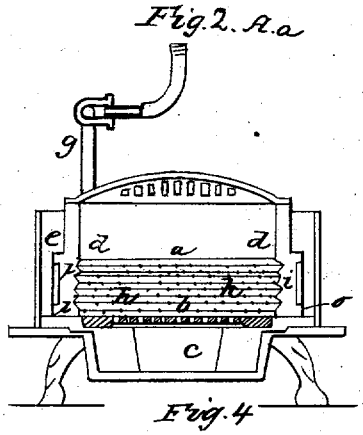
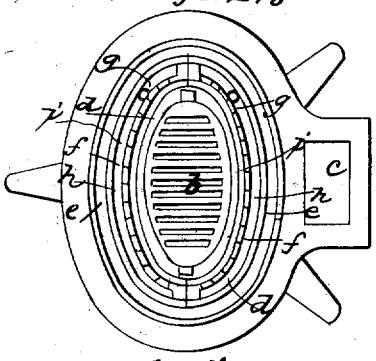
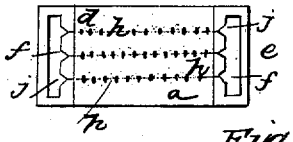
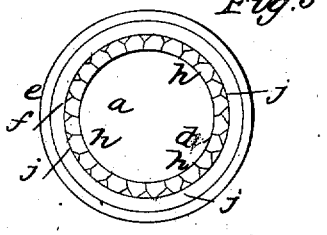
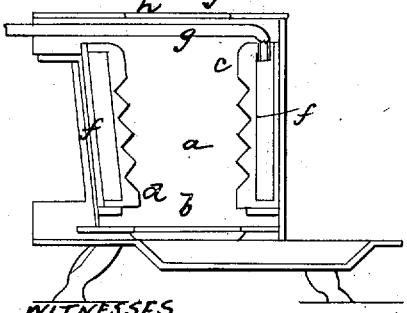
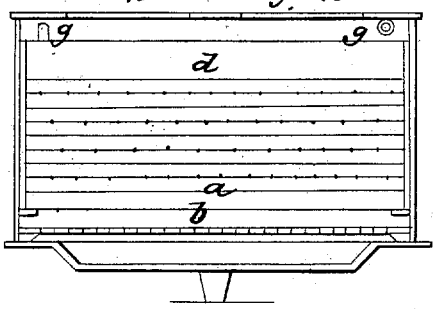
WITNESSES
O. A. Locke
A Macdaniel
INVENTOR
W. E. Hagan
N. PETERS, Photo-Lithographer, Washington, D. C.

UNITED STATES PATENT OFFICE.

WILLIAM E. HAGAN, OF TROY, ASSIGNOR, BY MESNE ASSIGNMENTS, TO THE HAGAN MANUFACTURING COMPANY, OF NEW YORK, N. Y., AND SAID WILLIAM E. HAGAN.

IMPROVEMENT IN STOVES BY THE INTRODUCTION OF SUPERHEATED STEAM UPON THE FUEL.

Specification forming part of Letters Patent No. 41,897, dated March 8, 1864; Reissue No. 1,987, dated June 6, 1865.

DIVISION A.

*To all whom it may concern:*

Be it known that I, WILLIAM E. HAGAN, of Troy, Rensselaer county, and State of New York, have invented a new and improved method of burning fuel for generating heat and preventing smoke by the introduction of superheated steam without admixture of atmospheric air in the fire; and I do hereby declare that the following is a full, clear, and exact description thereof, reference being had to the accompanying drawings, making part of this specification, in which—

Figure 1 is a cross vertical section of the lower part of a heating-stove for burning fuel according to my improved method. Fig. 2 is a vertical section thereof, taken at the line A *a* of Fig. 1; and Fig. 3 is a horizontal section taken at the base on the line B *b* of Fig. 1. Fig. 4 is a vertical, and Fig. 5 a horizontal, section of a modified form of the fire-chamber. Fig. 6 is a longitudinal vertical, and Fig. 7 is a cross vertical, section of a cooking-stove for burning fuel according to my said improved method.

In the accompanying drawings the same letters indicate like parts.

The letter *a* represents a fire-chamber, with a grate, *b*, at bottom, on which the fuel to be burned is placed. There is an ash-pan, *c*, below, of the usual or any suitable construction, so that atmospheric air can have access through it and between the grate-bars to the fuel, not only to ignite it, but afterward during the process of combustion. The fire-chamber is formed by an inner surrounding wall, *d*, and between the inner and the outer wall, *e*, there are two steam-chambers, *f f*; or, if preferred, a single steam-chamber may extend all around. The steam-chambers are provided each with a steam-pipe, *g*, extending to any suitable generator, whether so placed as to have the steam generated by the fire in the fire-chamber *a* or by any other fire. The steam supplied to the chamber or chambers *f* is superheated by the heat radiated from the inner wall, *d*, and escapes in numerous fine jets through a series of apertures, *h*, made for that purpose through the inner wall, *d*. The inner surface of the inner wall, *d*, is grooved, as represented at *i* in Figs. 1 and 2, the bottom of the grooves being in line with the series of holes, to reduce the thickness of the wall at the perforations through which the steam is supplied to the incandescent coals to prevent the too rapid destruction of the wall by oxidation. Instead of making these grooves on the inner surface next to the fire, they may be made on the other or steam side, and they may run in any direction, although I prefer the direction represented; or, instead of grooves, the thickness of the wall may be reduced at the several perforations, in the manner represented in Figs. 4 and 5, by conical recesses or countersinks, as at *j*. The fire-chamber should be filled with the fuel, so as to be in contact with the inner wall and extend up to or above the upper row of perforations.

The fuel is ignited in the usual manner by a draft of atmospheric air from the ash-pan, and after the coals are in an incandescent state steam is to be admitted to the chamber or chambers *f*, where it will be superheated, and escape through the apertures *h* and impinge in numerous small jets against the ignited coals. The supply of steam thus introduced will check the draft of air through the fuel, although a sufficient quantity will continue to pass to maintain the fuel in an incandescent state. The superheated steam thus supplied and impinging in numerous fine jets against the incandescent coals will be instantly decomposed, and the resulting gases in the nascent state will combine with gaseous products of the coal in the nascent state, and thus generate more heat from a given quantity of fuel than by any other known method. A larger volume of flame will be produced, so that the heat evolved can be diffused to great advantage. The union of the gases in the nascent state will effectually prevent the evolution of smoke. No oxidizing gases will be evolved, so that the fire-chambers can be safely constructed of materials which would otherwise be readily destroyed by oxidation, and the heated products of the combustion for the same reason will be admirably adapted to metallurgical operations, and sulphur, if any be contained in the fuel, will be oxidized or so much diluted that flame fitted for metallurgical operations may be obtained from pyritous fuel.

In Figs. 6 and 7 of the accompanying drawings, which represent my said method of burning fuel as applied to cooking-stoves, *a* is an oblong fire-chamber, and *b* the grate on which the fuel is placed, and *c* and *d* the front and back fire-walls, grooved and pierced with numerous small holes for the escape of superheated steam to impinge on the incandescent coals, as above described, from the steam-chambers *f f*, which are to be supplied with steam by the pipes *g g*, leading from a suitable generator.

Suitable boiler-holes, *h h*, are to be formed in the top plate above the fire-chambers. Ovens and other appurtenances are to be provided as in other cooking stoves and ranges.

If desirable, steam-chambers and perforated walls may be made at the ends of the fire-chambers as well as at the front and at the back.

When superheated steam impinges on ignited coal or flaming fuel, it becomes decomposed into hydrogen and carbonic-acid gases. The intense ignition of the coal is somewhat reduced by the heat absorbed in the act of decomposition, and the highly-heated gases convey it away to the point where they burn. Where the fuel is such as would produce smoke through its volatile constituents burning imperfectly in air, the highly-heated steam seizes upon them and suffers decomposition. The mixtures of hydrogen and carbonic acid are present momentarily, as in the case of the steam impinging on ignited coal, the more combustible parts of the coal or fuel having been first taken up to form these gases. The second reaction is the combustion of the hydrogen by the carbonic acid ($CaO^2$) present at an elevated temperature, developing a great additional heat with the formation of carbonic oxide, (CaO,) which consumes afterward in presence of air.

As steam has heretofore been applied, we have had steam thrown on coal under conditions favoring the production of hydrogen, carbureted hydrogen, and carbonic oxide, which were burned further on by contact with air and produced heat; but the robbing of the fuel of its heat of combustion to form carbonic oxide left little gain in economical result, and only in cases of special application were such modes important. By my discovery, however, the heated vapor of water, forming at once carbonic acid, maintains the heat of combustion nearly as well as air does, while at a more distant part of their flow the intense heat following the combustion of hydrogen by carbonic acid is obtained, the carbonic oxide resulting burning as it comes in contact with the air. The essential difference between this and the well-known plans rests on the modifications of combustion brought about by the limited amount of air supplied to the burning fuel and the substitution of heated vapor, ($H\ O^3$,) for air in part. Economically the result obtained has a high value, as it prevents the accumulation of heat in masses of fuel, and destruction thereby of furnace-walls. It carries the heat in a voluminous flames to the place of application. Although I believe this to be the true explanation of the chemical changes in working my said method, I do not wish to be understood as resting my claims on the soundness of the theory as herein stated, my claims resting on the discovery of the better results due to the application of superheated steam, so as to impinge directly against incandescent coals without admixture of atmospheric air, but in connection with atmospheric air as applied by draft or blast in the usual way.

I am aware that prior to my discovery steam was applied to aid in the combustion of fuel; but in such cases it was either applied with atmospheric air below the grate or applied separately above the fuel and with the blast or draft of atmospheric air from below; but neither of these methods will produce results like my discovery or invention.

What I claim as my discovery or invention, in the management of combustion in fire-chambers, is—

1. The application, substantially as herein described, of superheated steam in jets, so as to impinge, without admixture with atmospheric air, directly against the incandescent coals, in addition to or in combination with the supply separately of atmospheric air either by draft or blast in the usual manner, as set forth, and for the purposes specified.

2. In the construction of fire-chambers for the combustion of fuel, and provided with apertures at or near the bottom for the admission of atmospheric air, combining therewith a steam chamber or chambers for superheated steam, the inner wall of the steam chamber or chambers having numerous small apertures next to the fuel for the escape of the superheated steam to impinge, without admixture of atmospheric air, against the incandescent coals, substantially as and for the purposes specified.

3. In the construction of fire chambers, combined substantially as herein described, with a chamber or chambers for superheated steam, and with numerous apertures for the escape of superheated steam in jets to impinge against the incandescent coals, making the perforated wall of the fire-chamber grooved, or the equivalent thereof, to reduce the thickness thereof at the perforations, substantially as and for the purposes specified.

In testimony whereof I have hereunto set my hand this 8th day of March, 1865.

W. E. HAGAN.

Witnesses:

CHARLES D. KELLUM,
MARCUS P. NORTON.